US010183376B1

(12) United States Patent
Xiong et al.

(10) Patent No.: US 10,183,376 B1
(45) Date of Patent: Jan. 22, 2019

(54) CARRIER FOR MOUNTING A BAR OF SLIDERS OR A STACK OF SUCH BARS TO BE LAPPED

(71) Applicant: Seagate Technology LLC, Cupertino, CA (US)

(72) Inventors: Yuhong Xiong, Maple Grove, MN (US); Joel W. Hoehn, Hudson, WI (US); Yeoh Hooi Sze, Kedah (MY); Ng Kok Cheong, Penang (MY)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/298,883

(22) Filed: Oct. 20, 2016

Related U.S. Application Data (60) Provisional application No. 62/243,899, filed on Oct. 20, 2015.

(51) Int. Cl.
  *B24B 37/04* (2012.01)
  *G11B 5/31* (2006.01)
(52) U.S. Cl.
  CPC .......... *B24B 37/048* (2013.01); *G11B 5/3169* (2013.01)
(58) Field of Classification Search
  CPC .................. B24B 37/048; G11B 5/3169
  USPC ......... 451/1, 5, 11, 28, 41; 29/603.1, 15, 16, 29/593
  See application file for complete search history.

(56) References Cited

U.S. PATENT DOCUMENTS

| | | | | |
|---|---|---|---|---|
| 4,517,041 A | * | 5/1985 | Hennenfent | B23Q 1/03 156/155 |
| 5,036,630 A | * | 8/1991 | Kaanta | B24B 37/015 451/288 |
| 5,607,340 A | * | 3/1997 | Lackey | B24B 37/048 29/603.16 |
| 5,624,298 A | * | 4/1997 | Yumoto | B23Q 1/03 451/28 |
| 6,050,878 A | * | 4/2000 | Kanzo | B24B 37/048 451/1 |
| 6,093,083 A | * | 7/2000 | Lackey | B24B 37/048 29/603.16 |
| 6,174,218 B1 | * | 1/2001 | Church | B24B 37/048 451/364 |
| 6,287,170 B1 | * | 9/2001 | Hao | B24B 37/048 451/1 |
| 6,722,947 B2 | * | 4/2004 | Nishioka | B24B 37/00 29/603.16 |
| 6,875,079 B2 | * | 4/2005 | Kegeler | B24B 7/22 451/461 |
| 7,562,435 B2 | * | 7/2009 | Mahadev | G11B 5/6005 156/268 |
| 7,871,306 B1 | * | 1/2011 | Lytle | B24B 37/12 451/10 |

(Continued)

*Primary Examiner* — George Nguyen
(74) *Attorney, Agent, or Firm* — Kagan Binder, PLLC (57) ABSTRACT

Embodiments of the present disclosure include carriers for a row bar or stack of row bars to be lapped. In some embodiments, the ratio of the coefficient of thermal expansion of at least the bridge of a carrier to the coefficient of thermal expansion of the slider row bar or stack of slider row bars is less than 1.6. In some embodiments, a carrier can include a bridge having a length longer than the row bar or stack of row bars. In some embodiments, one or more bridge bending members can have junction centerlines offset from the corresponding bridge bending members.

21 Claims, 8 Drawing Sheets

(56) References Cited

U.S. PATENT DOCUMENTS

| | | |
|---|---|---|
| 8,066,547 B1 | 11/2011 | Schuh et al. |
| 9,427,842 B1 * | 8/2016 | Moravec ................. B24B 37/27 |
| 9,776,299 B2 * | 10/2017 | Herendeen ............ B24B 37/048 |
| 2004/0075942 A1 * | 4/2004 | Bajorek ................... G11B 5/10 |
| | | 360/122 |
| 2004/0209546 A1 * | 10/2004 | Nishioka ............... B24B 37/005 |
| | | 451/5 |
| 2015/0099438 A1 | 4/2015 | Xiong et al. |
| 2015/0258655 A1 | 9/2015 | Koon et al. |

* cited by examiner

CARRIER FOR MOUNTING A BAR OF SLIDERS OR A STACK OF SUCH BARS TO BE LAPPED

RELATED APPLICATION

The present non-provisional patent application claims the benefit of commonly owned provisional Applications having Ser. No. 62/243,899, filed on Oct. 20, 2015, which provisional Application is incorporated herein by reference in its entirety.

FIELD

The present disclosure relates to a carrier used to lap one or more bars of sliders (magnetic heads) that can be used in a hard disk drive.

SUMMARY

Embodiments of the present disclosure include a carrier for supporting one or more slider row bars during a lapping process. The carrier includes a bridge for mounting and supporting the one or more slider row bars during a lapping process, wherein the one or more slider row bars to be mounted on the carrier have a first coefficient of thermal expansion and the bridge has a second coefficient of thermal expansion, wherein the ratio of the second coefficient of thermal expansion to the first coefficient of thermal expansion is less than 1.6.

Embodiments of the present disclosure also include a carrier for supporting one or more slider row bars during a lapping process. The carrier includes a bridge for mounting and supporting the one or more slider row bars during a lapping process, wherein the bridge has a length and the one or more slider row bars have a length, and wherein the bridge length is greater than the length of the one or more slider row bars length.

Embodiments of the present disclosure also include a carrier for supporting one or more slider row bars during a lapping process. The carrier includes:
a) a bridge comprising:
  i) a first outer end;
  ii) a second outer end;
  iii) a first major surface for mounting and supporting the one or more slider row bars during a lapping process; and
  iv) a second major surface opposite the first major surface; and
b) a plurality of bridge bending members, wherein each bridge bending member is physically connected to the bridge via a junction and is positioned adjacent to the second major surface of the bridge, wherein each bridge bending member is perpendicular to the second major surface, wherein at least a portion of the junction of a first outermost bridge bending member overlaps with the first outer end of the bridge, and wherein at least a portion of the junction of a second outermost bridge bending member overlaps with the second outer end of the bridge.

DETAILED DESCRIPTION

Figure 1:
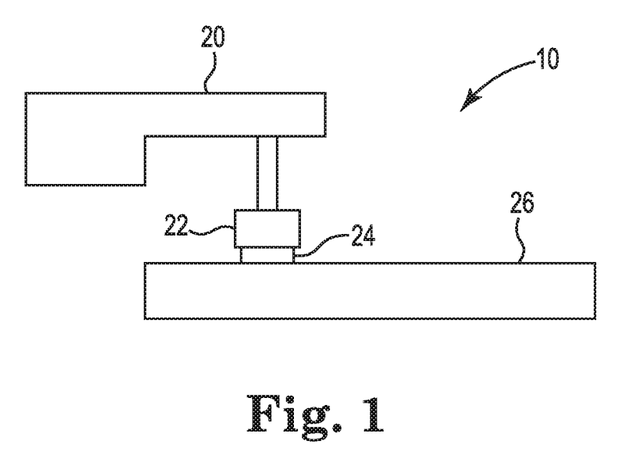
FIG. 1 is a schematic view of a lapping apparatus.
Figure 2:
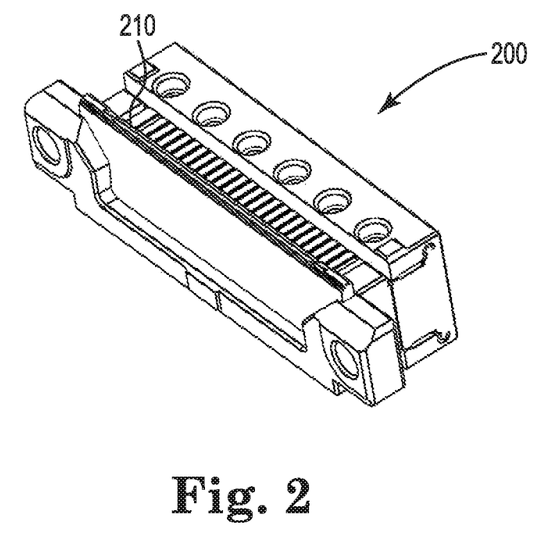
FIG. 2 is a perspective view of a carrier according to the present disclosure.

FIG. 1 schematically depicts a lapping apparatus 10 used for dimensioning (i.e., "lapping") one or more slider row bars 24. A single slider row bar can be lapped individually. Alternatively, a stack of two or more row bars in the form of an integral piece of material can be processed by lapping the stack, cutting a row bar from the stack, followed by lapping the stack again and cutting another row bar from the stack. This sequential process of lapping and cutting can be used to process a stack of any desired number of row bars (e.g., a stack of two or more row bars, 5 or more row bars, 10 or more row bars, and so on). In some embodiments, a stack of row bars includes a continuous slider row bar that can be cut into from two to twenty individual slider row bars.

Slider row bars can be made from a variety of materials. An exemplary material includes a two-phase ceramic material including alumina (i.e., aluminum oxide) and titanium-carbide (also referred to as "AlTiC") ceramic.

As shown, a carrier 22 is operably connected to a fixture 20, which can include a set of actuators. Carrier 22 has mounted thereon a slider row bar 24. Slider bar 24 is illustrated in contact with a lapping plate 26. Lapping plate 26 can include a plurality of abrasive particles on a platen. The abrasive particles may be present in a slurry or may be fixed to the surface of the platen, for example by adhesive or by electroplate. In use, lapping plate 26 can be rotated relative to a slider bar 24 held in a pressing engagement against the working surface of lapping plate 26. The abrading action due to the abrasive particles removes material from slider bar 24 and provides the desired shape.

Carrier 22 can be used for one or more lapping procedures such as rough lapping, fine lapping, kiss lapping, and the like.

An example of a carrier 22 according to the present disclosure is illustrated in FIGS. 2-6B as carrier 200. Carrier 200 can support one or more slider row bars (not shown) during a lapping process. According to the present disclosure, carrier 200 includes a bridge 210 for mounting and supporting the one or more slider row bars during a lapping process. As shown in FIGS. 2-6B, carrier 200 includes three major components: a base 220; a clamp 240; and an insert 230 that includes the bridge 210. The insert 230 is positioned and held between the base 220 and the clamp 240 in a mating manner.

The base 220 can include one or more mounting points to a lapping machine. Many different mounting methods can be used that can be arranged in different locations on the base 220. In one embodiment, the base 220 can include first 248 and second 250 mounting tabs that extend from the ends of the base 220, with first and second mounting holes 252, 254 passing through. Mounting screws or bolts (not shown) can pass through the mounting holes 252 and 254 and into threading holes in a lapping machine (not shown) to provide a strong and stable connection to the lapping machine so that carrier 200 is held firmly in place during lapping of a slider row bar.

The base 220 also has an insert surface (not shown) for the insert 230 to rest in the carrier 200. Threaded base mounting holes (not shown) can be provided to accept a screw or bolt for mounting the clamp 240 to the base 220.

The insert 230 includes bridge 210 and a plurality of bridge bending members 266.

Bridge 210 includes a first outer end 211 and a second outer end 213. Bridge 210 also includes a first major surface 215 for mounting and supporting the one or more slider row bars (not shown) during a lapping process. Bridge 210 also includes a second major surface opposite the first major surface 215.

As shown, the bridge 210 can provide a surface 215 onto which one or more slider row bars (not shown) can be bonded for lapping. Many different bonding methods and materials can be used that provide the necessary adhesive force during lapping and also allow a row bar to be easily removed from bridge 210 after lapping. Suitable bonding materials include thermoplastic adhesives that allow a row bar to be released from the bridge 210. Different adhesives can be used depending on the type of magnetic heads being lapped. In some embodiments, the adhesive can have a melting temperature of approximately 100° C. to release the row bar. In some embodiments the adhesive can be conductive by including conductive particles, such as silver particles.

A bridge can have dimensions such as a width, a length, and a thickness. In addition to bridge material selection, one or more bridge dimensions can influence the rigidity and flexibility of the bridge. Bridge flexibility can be balanced with bridge rigidity. For example, it can be desirable for a bridge to be sufficiently flexible so that bridge bending members (discussed further below) can flex bridge in a desired direction while at the same time it can be desirable for a bridge to have sufficient rigidity so that it can return to a "neutral" position after a force by a bridge bending member is released.

Figure 3:
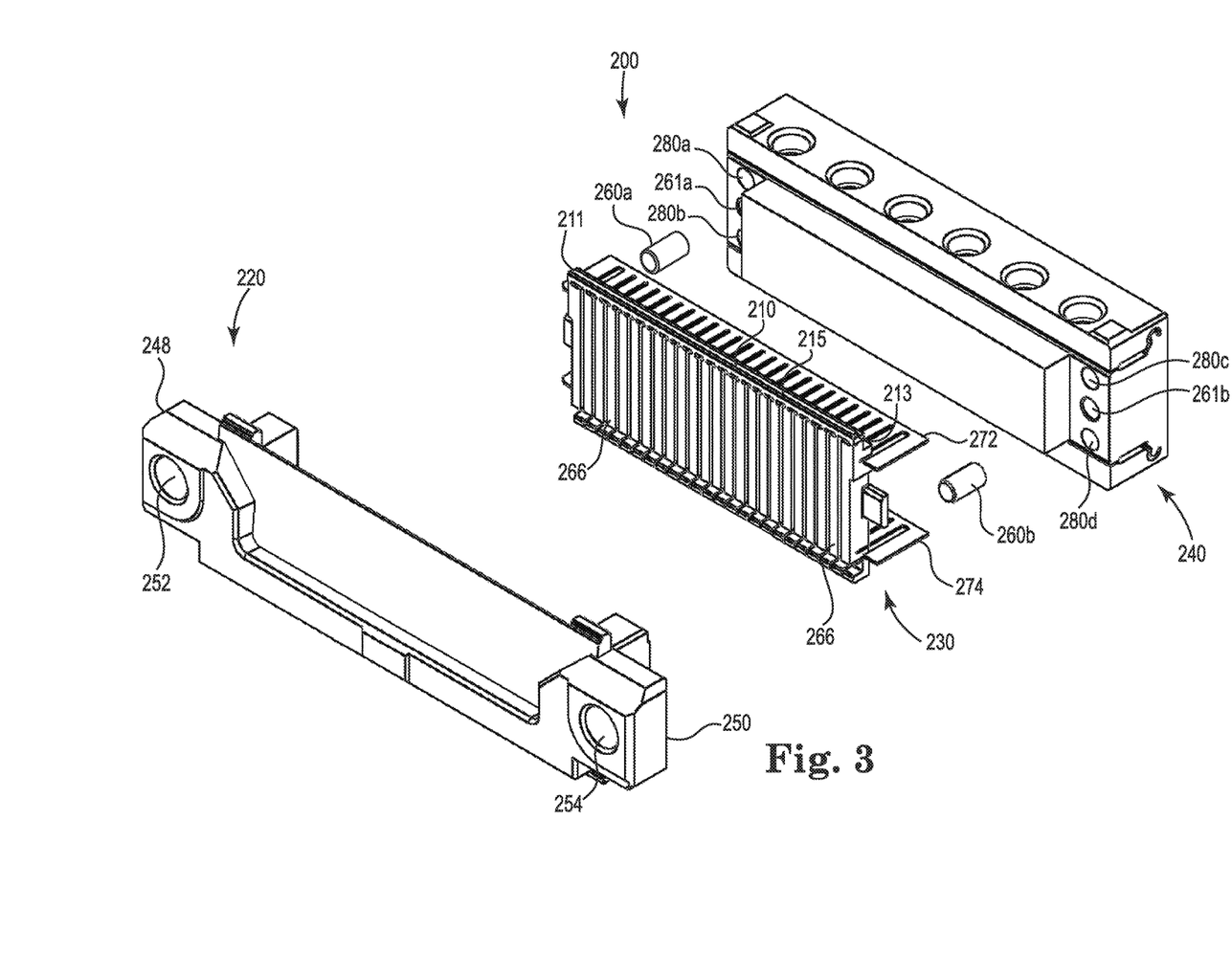
FIG. 3 is an exploded view of the carrier in FIG. 2.
Figure 4:
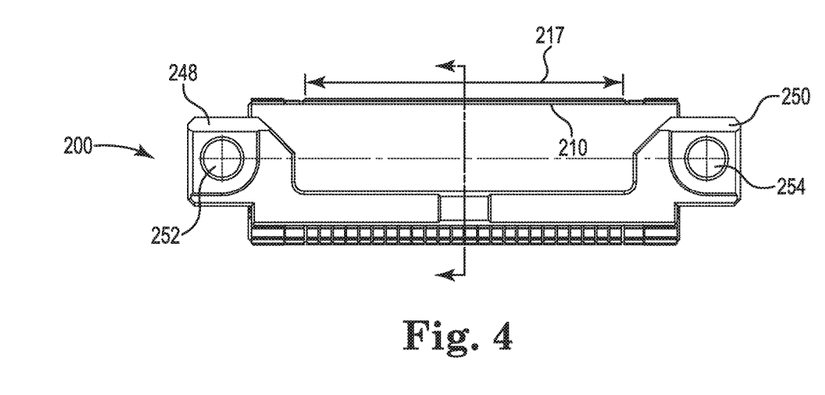
FIG. 4 is front elevation view of the carrier in FIG. 2.
Figure 5:
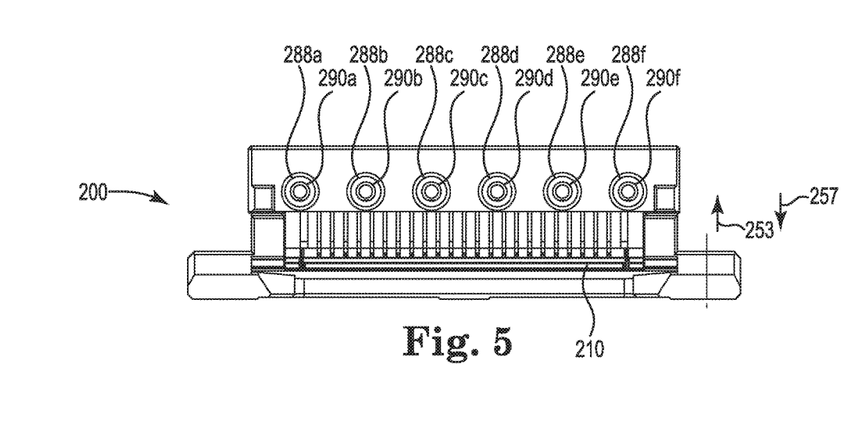
FIG. 5 is a top view of the carrier in FIG. 2.

The bridge length is illustrated in FIG. 4 as length 217. As shown in FIGS. 3 and 5, the bridge 210 can be long enough to at least cover all of the bridge bending members 266 and structurally support a row bar that is being lapped. In some embodiments, the bridge 210 has a length 217 that is greater than the length of the one or more slider row bars. For example, the length of a bridge 210 can be greater than 54 mm (e.g., 54.1 mm), which is longer than some slider row bars that are to be lapped. Advantageously, having a bridge length longer than a row bar to be lapped can provide better control of feature dimensions of individual sliders on the row bar as compared to a bridge length that is shorter than a row bar to be lapped, especially at the ends of the row bar. Having a bridge extend beyond the lengthwise ends of a row bar can provide sufficient structural support underneath the ends and help prevent undue flexing of the row bar. For example, if there is not sufficient structural support underneath the end portions of a row bar, the row bar may flex at the end portions to and undue degree and be "underlapped" at the end portions. A bridge according to the present disclosure can have a length within a wide range, depending on the length of a row bar to be lapped. In some embodiments for a full-length row bar, a bridge according to the present disclosure can have a length in a range from 20 to 70 mm, or even in a range from 50 to 60 mm. In other embodiments for a half-length bar, a bridge according to the present disclosure can have a length in a range from 10 to 35 mm, or even in a range from 25 to 30 mm.

Figure 6A:
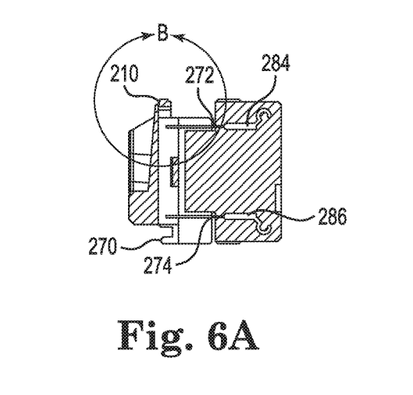
FIG. 6A is an cross-sectional view of the carrier in FIG. 4 along line A-A.
Figure 6B:
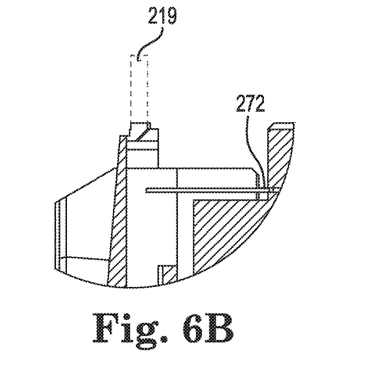
FIG. 6B is an enlarged view of the portion B in FIG. 6A.

Bridge width is illustrated in FIG. 6B as length 219. The bridge can be wide enough to structurally support a row bar that is being lapped. Bridge flexibility can increase as bridge width decreases and can decrease as bridge width increase. The bridge width can be selected to provide a desired flexibility so that bridge bending members (discussed further below) can flex bridge in a desired direction while at the same time providing desired rigidity to the bridge. In some embodiments, the bridge width is less than the width of a row bar being lapped. In some embodiments, a bridge according to the present disclosure can have a width in the range from 0.1 to 3.0 mm, or even in the range from 0.5 to 1.5 mm.

Figure 7:
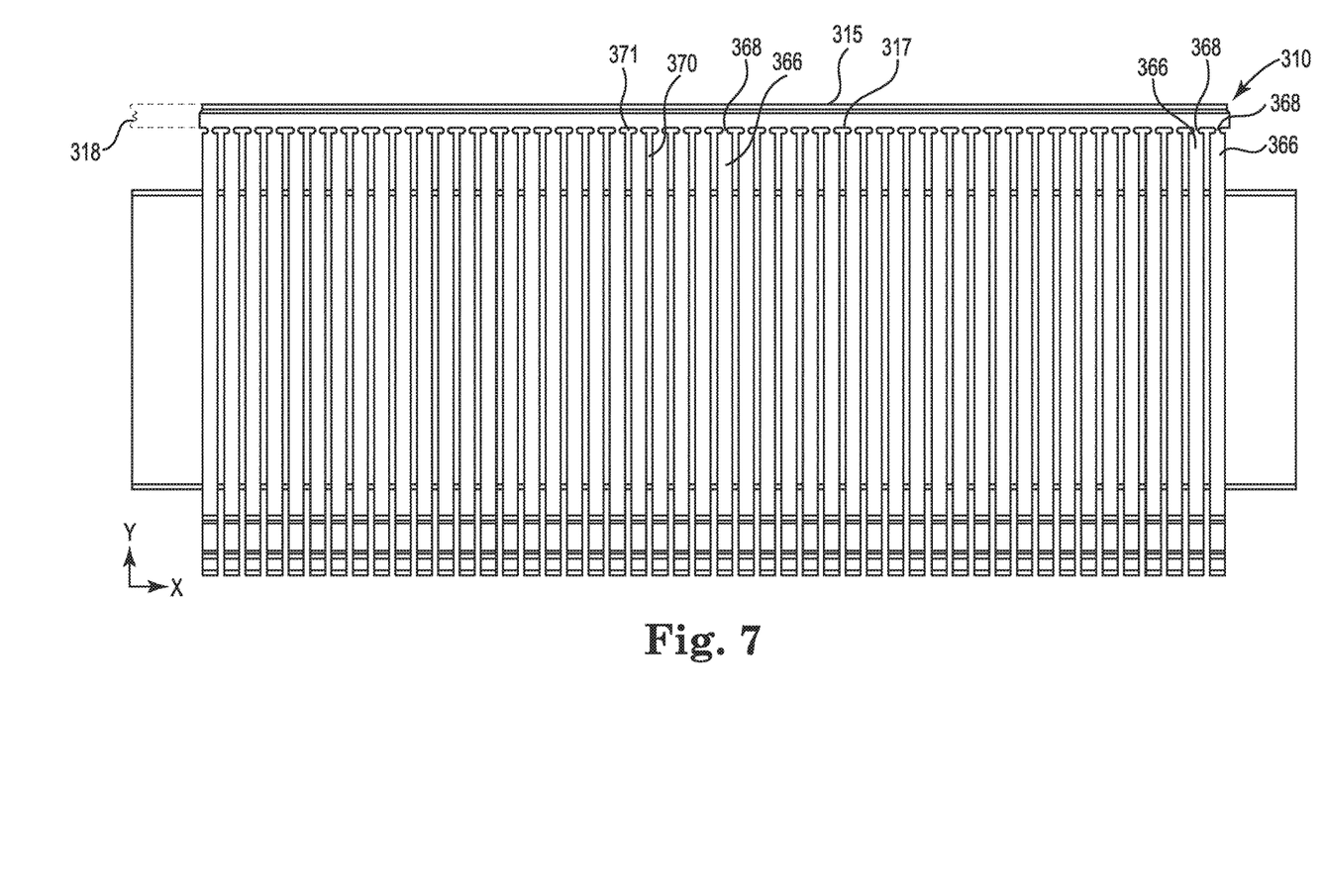
FIG. 7 is a schematic illustration of an embodiment of a bridge and a plurality of bridge bending members.

Bridge thickness is illustrated in FIG. 7 as thickness 318. The bridge is desirably thick enough to structurally support a row bar that is being lapped. Further, the bridge thickness can be thick enough so that, e.g., bridge 310 does not flex to an undue degree into the space between the bridge bending members 366 during lapping yet can be thin enough to have a desired flexibility so that bridge bending members (discussed further below) can flex bridge in a desired direction. Bridge flexibility can increase as bridge thickness decreases and can decrease as bridge thickness increases. In some embodiments, as shown, surface 315 can be an uninterrupted surface to further help prevent undue flexing into the space between the bridge bending members 366 during lapping. In some embodiments, a bridge according to the present disclosure can have a thickness from 0.5 mm to 2 mm, or even from 1.00 mm to 1.40 mm.

Referring back to FIGS. 2-6B, bridge bending members 266 can help control the flexing of the bridge 210 during lapping. For example, as shown in FIG. 5, one or more bridge bending members 266 can move in the directions indicated by arrows 253 and 257 under the control of a lapping machine, such as apparatus 10 shown in FIG. 1, so as to flex bridge 210 in a correspondingly desired manner. Moving the bridge in such a manner can cause the attached one or more row bars to move in a corresponding manner so as to help "bend" imperfections out of a row bar being lapped so that the feature dimensions of each individual slider are on target with specifications simultaneously at the end of lapping (e.g., so that "stripe height" of each slider in the row bar is within target simultaneously at the end of the lapping).

Figure 8:
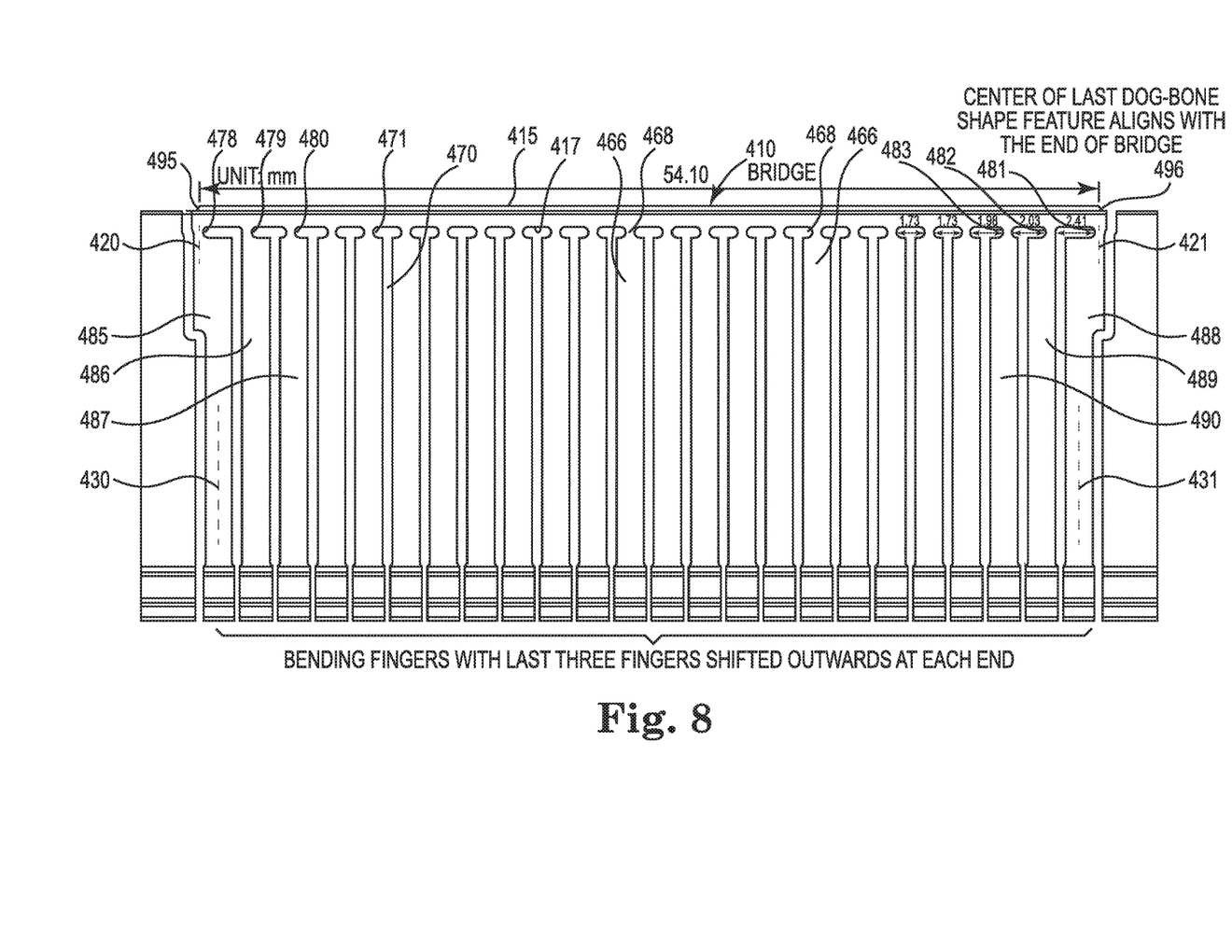
FIG. 8 is a schematic illustration of another embodiment of a bridge and a plurality of bridge bending members.

Two examples of a bridge and a plurality of bridge bending members are illustrated in FIGS. 7 and 8.

In some embodiments, a bridge and plurality of bridge bending members can be configured as shown in FIG. 7. In FIG. 7, bridge 310 has a first major surface 315 for mounting and supporting the one or more slider row bars (not shown) during a lapping process. Bridge 310 also includes a second major surface 317 opposite the first major surface 315.

As shown, each bridge bending member 366 is physically connected to the bridge 310 via a junction 368 and is positioned adjacent to the second major surface 317 of the bridge 310. As also shown in FIG. 7, each bridge bending member 366 is perpendicular to the second major surface 317. Each bridge bending member 366 has space 370 between adjacent bridge bending members 366 so that each bridge bending member 366 can move independently and help provide localized force to bridge 310 to help "bend" imperfections out of a row bar being lapped so that the feature dimensions of each individual slider are on target with specifications simultaneously at the end of lapping. As shown, each junction 368 is narrower in width than each corresponding bridge bending member 366, thereby forming a "dog-bone" shaped space 371 between adjacent junctions 368.

In some embodiments, a bridge and plurality of bridge bending members can be configured as shown in FIG. 8.

In FIG. 8, bridge 410 has a first major surface 415 for mounting and supporting the one or more slider row bars (not shown) during a lapping process. Bridge 410 also includes a second major surface 417 opposite the first major surface 415.

As shown, each bridge bending member 466 is physically connected to the bridge 410 via a junction such as junction 468 and is positioned adjacent to the second major surface 417 of the bridge 410. As also shown in FIG. 8, each bridge bending member 466 is perpendicular to the second major surface 417. Each bridge bending member 466 has space 470 between adjacent bridge bending members 466 so that each bridge bending member 466 can move independently and help provide localized force to bridge 410 to help "bend" imperfections out of a row bar being lapped so that the feature dimensions of each individual slider are on target with specifications simultaneously at the end of lapping. As shown, at least some of the junctions 468 are narrower in width than a corresponding bridge bending member 466, thereby forming a "dog-bone" shaped space 471 between adjacent junctions 468.

In some embodiments, at least a portion of the junction of a first outermost bridge bending member overlaps with the first outer end of the bridge, and wherein at least a portion of the junction of a second outermost bridge bending member overlaps with the second outer end of the bridge. For example, as shown in FIG. 8, at least a portion of the junction 478 of a first outermost bridge bending member 485 overlaps with the first outer end 495 of the bridge 410, and at least a portion of the junction 481 of a second outermost bridge bending member 488 overlaps with the second outer end 496 of the bridge 410. Advantageously, shifting at least the junctions 478 and 481 in such a manner can help improve the structural support that bridge 410 provides to a row bar mounted thereon during lapping and can help prevent undue flexing of the row bar during lapping and improve the ability to "bend" imperfections out of a row bar (especially at the ends) being lapped so that the feature dimensions of each individual slider are on target with specifications simultaneously at the end of lapping.

In some embodiments, the junction of the first outermost bridge bending member has a centerline that is collinear with the first end of the bridge and the junction of the second outermost bridge bending member has a centerline that is collinear with the second end of the bridge. For example, as shown in FIG. 8, the junction 478 of the first outermost bridge bending member 485 has a centerline 420 that is collinear with the first end 495 of the bridge 410 and the junction 481 of the second outermost bridge bending member 488 has a centerline 421 that is collinear with the second end 496 of the bridge 410. Having the centerline of the junction collinear with the end of the bridge can help focus the force loading point from the bridge bending member on target with the end of the bridge.

In some embodiments, each junction and each corresponding bridge bending member have a centerline; at least the centerline of the junction of the first outermost bridge bending member is offset from the first outermost bridge bending member centerline and toward the first outer end of the bridge; and at least the centerline of the junction of the second outermost bridge bending member is offset from the second outermost bridge bending member centerline and toward the second outer end of the bridge. For example, all of the junctions and bridge bending members in FIG. 8 have centerlines. The centerline 420 of the junction 478 of the first outermost bridge bending member 485 is offset from the first outermost bridge bending member centerline 430 and toward the first outer end 495 of the bridge 410. Also, the centerline 421 of the junction 481 of the second outermost bridge bending member 488 is offset from the second outermost bridge bending member centerline 431 and toward the second outer end 496 of the bridge 410. Further, in some embodiments, one or more additional junction centerlines can be offset toward an outer end of the bridge. Advantageously, by offsetting one or more additional junction centerlines toward an outer bridge can provide different bridge support characteristics and can reduce undue flexing of a row bar mounted thereon. For example, as shown in FIG. 8, junctions 479 and 480 of inner bridge bending members 486 and 487, respectively, each have centerlines that are offset from the centerlines of bridge bending members 486 and 487, respectively, and toward the first outer end 495 of the bridge 410. Likewise, as shown in FIG. 8, junctions 482 and 483 of inner bridge bending members 489 and 490, respectively, each have centerlines that are offset from the centerline of bridge bending members 489 and 490, respectively, and toward the second outer end 496 of the bridge 410. In some embodiments, the centerline of the junction of one or more inner bridge bending member is collinear with the centerline of the corresponding inner bridge bending member centerline. For example, as shown in FIG. 8, the centerline of a junction 468 of an inner bridge bending member 466 is collinear with the centerline of the corresponding inner bridge bending member 466 centerline.

It is noted that offsetting a junction such as junction 478 can change (e.g., increase) the space between adjacent junctions such as between junction 478 and 479.

Referring back to FIGS. 2-6B, the number of bridge bending members 266 can vary depending on a variety of factors such as the number of slider heads in the row that is being lapped. In some embodiments, a carrier can include greater than 5 bridge bending members, greater than 20 bridge bending members, or even greater than 50 bridge bending members. For example, a carrier can include 48 bridge bending members 266. As mentioned, a bridge bending member can be independently manipulated to move in the directions indicated by arrows 253 and 257. As best shown in FIG. 6A, carrier 200 has a series of hooks 270, opposite the bridge 210, with each of the hooks 270 used by a lapping system to manipulate one of the bridge bending members 266. A lapping machine has a series of controls that engage the hooks 270 when carrier 200 is mounted to the lapping machine.

Insert 230 also includes first and second flexures 272 and 274 that provide anchors for the bridge bending members 266. As shown, the flexures 272 and 274 are firmly mounted to the clamp 240 so that the bridge bending members 266 can move back and forth under control of a lapping machine, with the flexures 272 and 274 causing the bridge bending members to return to a neutral position when the force from the lapping machine controls is removed.

As shown, for insert 230 the bridge 210 is formed integral to the bridge bending members 266 during fabrication. Alternatively, the bridge 210 can be formed separately and bonded to the bridge bending members 266. In embodiments where the bridge 210 is separately manufactured, it can be made of the same or different material than the bridge bending members 266. Separately formed bridges can be mounted to bridge bending members using adhesives or by brazing.

As shown, carrier 200 also includes a clamp 240 that is mounted to the base 220 with the insert 230 held between the base 220 and clamp 230. Clamp 240 can include clamp mounting holes 280 *a-d* that align with the base mounting holes (not shown) in the base 220. Assembly fasteners (not shown) can be included that are sized to pass through the clamp mounting holes 280 *a-d* and mate with the base mounting holes to mount the clamp 240 to the base 220. Clamp 240 can also include clamp alignment holes 261 *a-b* that align with the base alignment holes (not shown) in the base 220. Alignment pins 260 *a-b* can be included that are sized to securely fit in clamp alignment holes 261 *a-b* and mate with the base alignment holes to align the clamp 240 with the base 220.

As shown in FIG. 6A, clamp 240 can also include first and second longitudinal slots 284 and 286 that are sized to accept the first and second flexures 272 and 274, respectively, of the insert 230. As shown in, for example, FIG. 5, when the carrier 200 is assembled, the top portion of each of the flexures 272 and 274 are inserted into the slots 284 and 286, respectively, and remain in the slots in the finally assembled carrier 200. As shown, the clamp 240 further includes threaded first flexure holes 288 *a-f* sized to mate with first flexure screws 290 *a-f*, and threaded second flexure holes (not shown) on the opposite side of the clamp 240, sized to mate with second flexure screws (not shown). Each of the first screws 290 *a-f* turns into its respective one of the first flexure holes 288 *a-f* to close the first slot 284 on the top portion of the first flexure 272. The second screws similarly cooperate with second flexure holes to close the second slot 286 on the top portion of the second flexure 274. Different numbers of flexures screws can be used as desired to reliably clamp the flexures 272 and 274 in the slots 284 and 286, respectively, such that the flexures 272 and 274 are held in position. This can help the bridge bending members 266 to be accurately controlled by the lapping machine as described above.

Each of the base 220, insert 230, and clamp 240 can be made by a variety of techniques including electro discharge machining (EDM).

Each of the base 220, insert 230, and clamp 240 can be made out of a variety of rigid materials such as metal and/or ceramic. In some embodiments, the base 220, insert 230, and clamp 240 can each be made of different materials. In other embodiments, the base 220, insert 230, and clamp 240 can each be made of the same material.

In some embodiments, at least the bridge material can be selected to have a coefficient of thermal expansion relative to the coefficient of thermal expansion of the row bar (or stack of row bars) so as to prevent undue bowing of the row bar (or stack of row bars) as carrier cools after heating the carrier to reflow adhesive used to mount the row bar (or stack) to the bridge. For example, the one or more slider row bars to be mounted on the carrier can have a first coefficient of thermal expansion and at least the bridge can have a second coefficient of thermal expansion. The material of the bridge can be selected so that the ratio of the second coefficient of thermal expansion to the first coefficient of thermal expansion is less than 1.6, less than 1.5, or even less than 1.125. By selecting the coefficient of thermal expansion of at least the bridge material to be sufficiently close to the coefficient of thermal expansion of the row bar material (e.g., AlTiC), the bridge can expand or shrink in a relatively similar manner with the row bar during heating and cooling. Advantageously, bowing of the row bar can be kept to less than, e.g., 1 um and post fine lap stripe height sigma can be less than, e.g., 3 nm. Such improvements can increase production yield and/or save production cost.

In some embodiments, a bridge can be made out of material having coefficient of thermal expansion in the range from $5\times10^{-6}$/K to $11\times10^{-6}$/K, in the range from $6\times10^{-6}$/K to $10\times10^{-6}$/K, or even in the range from $7\times10^{-6}$/K to $9\times10^{-6}$/K. Exemplary materials having coefficient of thermal expansion within this range include materials made out of a titanium alloy.

In some embodiments, the entire insert (including the bridge, bridge bending members, and flexures) can be made of material selected to have a coefficient of thermal expansion relative to the coefficient of thermal expansion of the row bar (or stack of row bars) as described herein so as to prevent undue bowing of the row bar (or stack of row bars) as carrier cools after heating the carrier to reflow adhesive used to mount the row bar (or stack) to the bridge. For example, the one or more slider row bars to be mounted on the carrier can have a first coefficient of thermal expansion and the material of the entire insert can have a second coefficient of thermal expansion. The material of the insert can be selected so that the ratio of the second coefficient of thermal expansion to the first coefficient of thermal expansion is less than 1.6, less than 1.5, or even less than 1.125. In some embodiments, an entire insert can be made out of material having coefficient of thermal expansion is in the range from $7\times10^{-6}$/K to $9\times10^{-6}$/K. Exemplary materials having coefficient of thermal expansion within this range include materials made out of a titanium alloy.

In still other embodiments, the entire carrier (e.g., carrier 200) can be made of material selected to have a coefficient of thermal expansion relative to the coefficient of thermal expansion of the row bar (or stack of row bars) as described herein so as to prevent undue bowing of the row bar (or stack of row bars) as carrier cools after heating the carrier to reflow adhesive used to mount the row bar (or stack) to the bridge. For example, the one or more slider row bars to be mounted on the carrier can have a first coefficient of thermal expansion and the material of the entire carrier can have a second coefficient of thermal expansion. The material of the carrier can be selected so that the ratio of the second coefficient of thermal expansion to the first coefficient of thermal expansion is less than 1.6, less than 1.5, or even less than 1.125. In some embodiments, an entire carrier can be made out of material having coefficient of thermal expansion is in the range from $7\times10^{-6}$/K to $9\times10^{-6}$/K. Exemplary materials having coefficient of thermal expansion within this range include materials made out of a titanium alloy. In addition to selecting a material based on coefficient of thermal expansion, one or more carrier components (e.g., base, insert, and clamp) and/or one or more subcomponents (e.g., the bridge, bridge bending members, and flexures) can be made of material having one or more additional selected properties. In some embodiments, the base, the clamp, and/or insert are made out of material having a Young's Modulus of less than 200 gigapascals (GPa). Young's Modulus defines the relationship among stress and strain in a material and can be calculated by dividing the tensile stress by the extensional strain in the elastic portion of a stress/strain curve. In some embodiments, the base, the clamp, and/or insert are made out of material having a Rockwell Hardness (HRC) of greater than 30. Rockwell Hardness (HRC) is a hardness "C" scale reported as a dimensionless number and based on an indentation hardness of a material. In some embodiments, the base, the clamp, and/or insert are made out of material having a Yield Strength of greater than 600 megapascals (MPa). Yield Strength is the stress beyond which a material begins to deform plastically.

Example 1

Figure 9:
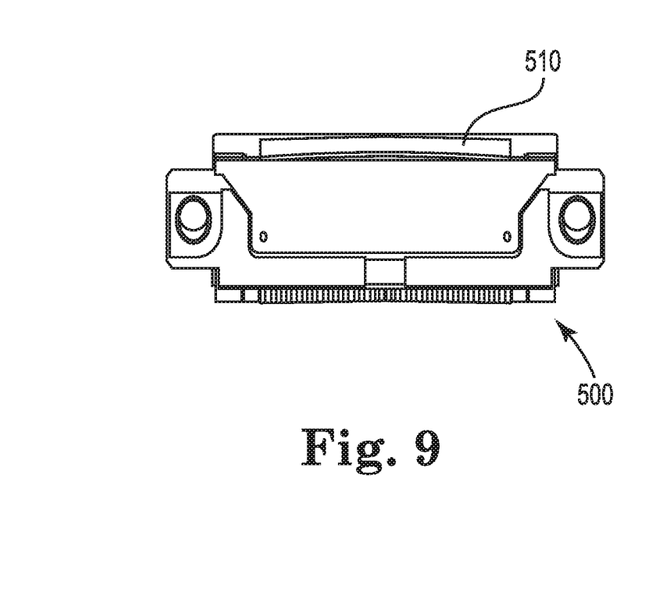
FIG. 9 is a front elevation view illustrating a carrier used in Example 1.
Figure 10:
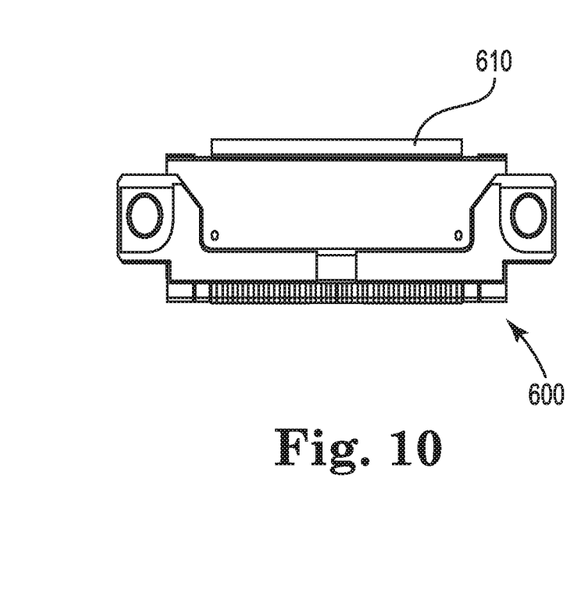
FIG. 10 is a front elevation view illustrating another carrier used in Example 1.

In Example 1, one carrier similar to carrier 200 was used and the base, insert, and clamp were each made out of stainless steel and another carrier similar to carrier 200 was used with the base and clamp each made out of stainless steel (SS17-4PH) and the insert made out a titanium alloy (Ti-6Al-4V (Grade 5)). A stack of AlTiC row bars 9 bars thick was mounted to the bridge of each carrier using an ethylene-vinyl-acetate-based hot melt adhesive. Each carrier was heated to greater than 100° C. to reflow the adhesive. Each carrier was then cooled to 25° C. As shown in FIG. 9, the carrier 500 with the stainless steel insert had a 6 micrometer concave bow along the length of stack 510 of row bars. As shown in FIG. 10, the carrier 600 with the titanium alloy insert had a 0.7 micrometer concave bow along the length of stack 610 of row bars. The coefficient of thermal expansion of the AlTiC row bars was $8 \times 10^{-6}$/K. The coefficient of the stainless steel (SS17-4PH) was $13 \times 10^{-6}$/K. The coefficient of thermal expansion of the titanium alloy (Ti-6Al-4V (Grade 5)) was $8.6 \times 10^{-6}$/K.

Figure 11:
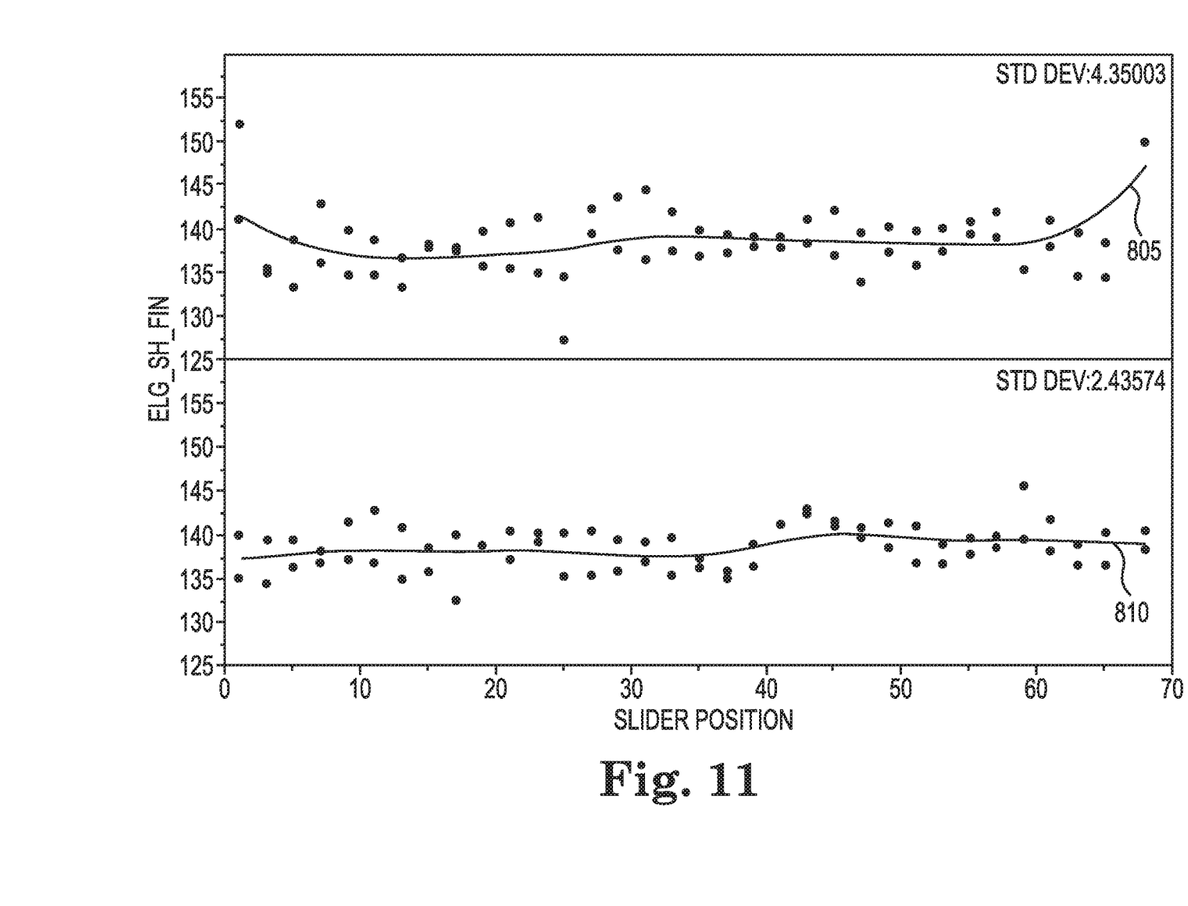
FIG. 11 is a graph representing lapping data of the carriers in Example 1.

FIG. 11 shows lapping performance data using a bridge and bridge bending members similar to those shown in FIG. 7. That data is represented by line 805. FIG. 11 also shows lapping performance data using a bridge and bridge bending members similar to those shown in FIG. 8. That data is represented by line 810. The y-axis represents "electronic lap guide stripe height final values" in a unit of nanometers (nm).

What is claimed is:

1. A carrier for supporting one or more slider row bars during a lapping process, the carrier comprising:
   a) a base;
   b) a clamp; and
   c) an insert that is positioned between the base and the clamp in a mating manner, wherein the insert comprises:
      i) a bridge for mounting and supporting the one or more slider row bars during a lapping process, wherein the bridge has a length and the one or more slider row bars have a length, and wherein the bridge length is greater than the length of the one or more slider row bars length; and
      ii) a plurality of bridge bending members.

2. The carrier of claim 1, wherein the one or more slider row bars comprises a continuous stack of slider row bars that can be cut into two or more individual slider row bars.

3. The carrier of claim 1, wherein the one or more slider row bars comprises a continuous stack of slider row bars that can be cut into from two to twenty individual slider row bars.

4. A carrier for supporting one or more slider row bars during a lapping process, the carrier comprising:
   a) a bridge comprising:
      i) a first outer end;
      ii) a second outer end;
      iii) a first major surface for mounting and supporting the one or more slider row bars during a lapping process; and
      iv) a second major surface opposite the first major surface; and
   b) a plurality of bridge bending members, wherein each bridge bending member is physically connected to the bridge via a junction and is positioned adjacent to the second major surface of the bridge, wherein each bridge bending member is perpendicular to the second major surface, wherein at least a portion of the junction of a first outermost bridge bending member overlaps with the first outer end of the bridge, and wherein at least a portion of the junction of a second outermost bridge bending member overlaps with the second outer end of the bridge.

5. The carrier of claim 4, wherein the junction of the first outermost bridge bending member has a centerline that is collinear with the first end of the bridge and the junction of the second outermost bridge bending member has a centerline that is collinear with the second end of the bridge.

6. The carrier of claim 4, wherein each junction and each corresponding bridge bending member have a centerline, wherein at least the centerline of the junction of the first outermost bridge bending member is offset from the first outermost bridge bending member centerline and toward the first outer end of the bridge; and wherein at least the centerline of the junction of the second outermost bridge bending member is offset from the second outermost bridge bending member centerline and toward the second outer end of the bridge.

7. The carrier of claim 6, wherein the centerline of the junction of one or more inner bridge bending members is offset from the corresponding inner bridge bending member centerline and toward the first outer end of the bridge or the second outer end of the bridge.

8. The carrier of claim 7, wherein the centerline of the junction of one or more inner bridge bending members is collinear with the centerline of the corresponding inner bridge bending member centerline.

9. The carrier of claim 4, wherein the carrier comprises:
   a) a base;
   b) a clamp; and
   c) an insert that is positioned between the base and the clamp in a mating manner, wherein the insert comprises the bridge and the plurality of bridge bending members.

10. The carrier of claim 9, wherein the base, the clamp, and/or insert are made out of material having a Young's Modulus of less than 200 gigapascals.

11. The carrier of claim 9, wherein the base, the clamp, and/or insert are made out of material having a Rockwell Hardness (HRC) of greater than 30.

12. The carrier of claim 9, wherein the base, the clamp, and/or insert are made out of material having a Yield Stress of greater than 600 megapascals.

13. The carrier of claim 4, wherein the bridge has a length and the one or more slider row bars have a length, and wherein the bridge length is greater than the length of the one or more slider row bars length.

14. The carrier of claim 4, wherein one or more slider row bars to be supported comprise alumina and titanium-carbide ceramic and the bridge comprises a titanium alloy.

15. The carrier of claim 4, wherein the one or more slider row bars to be supported on the carrier have a first coefficient of thermal expansion and the bridge has a second coefficient of thermal expansion, wherein the ratio of the second coefficient of thermal expansion to the first coefficient of thermal expansion is less than 1.6.

16. The carrier of claim 14, wherein the plurality of bridge bending members comprise a titanium alloy.

17. The carrier of claim 15, wherein the ratio of the second coefficient of thermal expansion to the first coefficient of thermal expansion is less than 1.5.

18. The carrier of claim 15, wherein the ratio of the second coefficient of thermal expansion to the first coefficient of thermal expansion is less than 1.125.

19. The carrier of claim 15, wherein the second coefficient of thermal expansion is in the range from $7\times10^{-6}$/K to $9\times10^{-6}$/K.

20. The carrier of claim 15, wherein the one or more slider row bars comprises a continuous stack of slider row bars that can be cut into two or more individual slider row bars.

21. The carrier of claim 15, wherein the one or more slider row bars comprises a continuous stack of slider row bars that can be cut into from two to twenty individual slider row bars.

\* \* \* \* \*